United States Patent
Czarnowski et al.

(10) Patent No.: US 12,125,482 B2
(45) Date of Patent: Oct. 22, 2024

(54) ADAPTIVELY RECOGNIZING SPEECH USING KEY PHRASES

(71) Applicant: INTEL CORPORATION, Santa Clara, CA (US)

(72) Inventors: Krzysztof Czarnowski, Gdansk (PL); Munir Nikolai Alexander Georges, Kehl (DE); Tobias Bocklet, Kronach (DE); Georg Stemmer, Munich (DE)

(73) Assignee: Intel Corporation, Santa Clara, CA (US)

( * ) Notice: Subject to any disclaimer, the term of this patent is extended or adjusted under 35 U.S.C. 154(b) by 857 days.

(21) Appl. No.: 16/692,150

(22) Filed: Nov. 22, 2019

(65) Prior Publication Data

US 2020/0090657 A1     Mar. 19, 2020

(51) Int. Cl.
| | | |
|---|---|---|
| *G10L 15/22* | (2006.01) | |
| *G06F 16/638* | (2019.01) | |
| *G10L 15/02* | (2006.01) | |
| *G10L 15/16* | (2006.01) | |
| *G10L 17/00* | (2013.01) | |
| *G10L 25/78* | (2013.01) | |
| *G10L 15/08* | (2006.01) | |

(52) U.S. Cl.
CPC ............ *G10L 15/22* (2013.01); *G06F 16/638* (2019.01); *G10L 15/02* (2013.01); *G10L 15/16* (2013.01); *G10L 17/00* (2013.01); *G10L 25/78* (2013.01); *G10L 2015/027* (2013.01); *G10L 2015/088* (2013.01); *G10L 2015/223* (2013.01)

(58) Field of Classification Search
CPC ......... G10L 15/22; G10L 15/02; G10L 15/16; G10L 17/00; G10L 25/78; G10L 2015/027; G10L 2015/088; G10L 2015/223; G06F 16/638

See application file for complete search history.

(56) References Cited

U.S. PATENT DOCUMENTS

| | | | |
|---|---|---|---|
| 5,832,181 A | 11/1998 | Wang | |
| 9,697,828 B1 * | 7/2017 | Prasad | .................... G10L 15/08 |
| 10,373,630 B2 * | 8/2019 | Ravindran | .............. G10L 15/30 |
| 10,403,266 B2 * | 9/2019 | Khellah | ................. G06N 3/084 |

(Continued)

FOREIGN PATENT DOCUMENTS

| | | |
|---|---|---|
| JP | H05232989 A | 9/1993 |
| JP | H09507921 A | 8/1997 |

(Continued)

OTHER PUBLICATIONS

Japanese Patent Office, "Notice of Reasons for Refusal," issued in connection with Japanese Patent Application No. 2020-143806, dated Aug. 20, 2024, 26 pages [English translation included].

*Primary Examiner* — Richemond Dorvil
*Assistant Examiner* — Nadira Sultana
(74) *Attorney, Agent, or Firm* — Hanley, Flight & Zimmerman, LLC

(57) ABSTRACT

An example apparatus for recognizing speech includes an audio receiver to receive a stream of audio. The apparatus also includes a key phrase detector to detect a key phrase in the stream of audio. The apparatus further includes a model adapter to dynamically adapt a model based on the detected key phrase. The apparatus also includes a query recognizer to detect a voice query following the key phrase in a stream of audio via the adapted model.

23 Claims, 8 Drawing Sheets

200

(56) References Cited

U.S. PATENT DOCUMENTS

| | | | |
|---|---|---|---|
| 10,672,380 B2 * | 6/2020 | Georges | G10L 15/22 |
| 2014/0229158 A1 * | 8/2014 | Zweig | G06N 3/04 |
| | | | 704/9 |
| 2016/0171974 A1 | 6/2016 | Hannun | |
| 2018/0182388 A1 * | 6/2018 | Bocklet | G10L 15/16 |
| 2019/0043481 A1 | 2/2019 | Georges et al. | |
| 2019/0043488 A1 * | 2/2019 | Bocklet | G10L 15/22 |
| 2019/0069154 A1 * | 2/2019 | Booth | H04W 4/90 |
| 2019/0103104 A1 | 4/2019 | Nicholls | |
| 2019/0228763 A1 * | 7/2019 | Czarnowski | G06N 3/04 |
| 2020/0175961 A1 * | 6/2020 | Thomson | G10L 15/28 |
| 2020/0349927 A1 * | 11/2020 | Stoimenov | G10L 17/24 |
| 2021/0050003 A1 * | 2/2021 | Zaheer | G10L 15/063 |

FOREIGN PATENT DOCUMENTS

| | | | | |
|---|---|---|---|---|
| JP | 2006113569 A | | 4/2006 | |
| JP | 2010055030 A | | 3/2010 | |
| JP | 2015049254 A | | 3/2015 | |
| JP | 2017538137 A | | 12/2017 | |
| KR | 20130126570 A | * | 11/2013 | G10L 15/187 |
| WO | 2019070823 A1 | | 4/2019 | |

* cited by examiner

100

200

600

ADAPTIVELY RECOGNIZING SPEECH USING KEY PHRASES

BACKGROUND

Speech recognizers are used to detect phrases in audio. For example, the phrases may include commands that may be used to perform one or more tasks.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Speech recognizers may be trained on huge audio corpora recorded by many people. Such speech recognizers may recognize a similar person speaking in a similar acoustic environment. However, a different acoustic environment or a person with a significantly different voice may lead to a decreasing recognition precision. For example, a background noise may cause recognition results with reduced precision.

The present disclosure relates generally to techniques for adaptively recognizing speech using key phrases. For example, the key phrases may be wake-words detected via wake-on-voice or pre-selected phrases that are more easily recognizable. Specifically, the techniques described herein include an apparatus, method and system for adaptively recognizing speech using key phrases. An example apparatus includes an audio receiver to receive a stream of audio. The apparatus also includes a key phrase detector to detect a key phrase in the stream of audio. The apparatus further includes a model adapter to dynamically adapt a model based on the detected key phrase. The apparatus also includes a query recognizer to detect a voice query following the key phrase in a stream of audio via the adapted model.

The techniques described herein use a key phrase such as a wake-word to adapt a model to the speaker as well as to the acoustic environment. The adapted model may then be used to more accurately detect commands that follow the key phrase. The adaptation may have a direct impact on the phrase that succeeds the wake word and any following voice queries. The techniques thus enable a more reliable adaptation process as the techniques do not assume on a good enough pseudo truth generation in a first pass. The techniques described herein thus enable improved speech recognition precision. Moreover, the techniques may introduce minimal latency as no re-scoring is applied. Instead, the present techniques use a backpropagation through the sequence of wake-word sub-phoneme units enabling a dynamic adaptation of a model used to detect voice queries.

Figure 1:
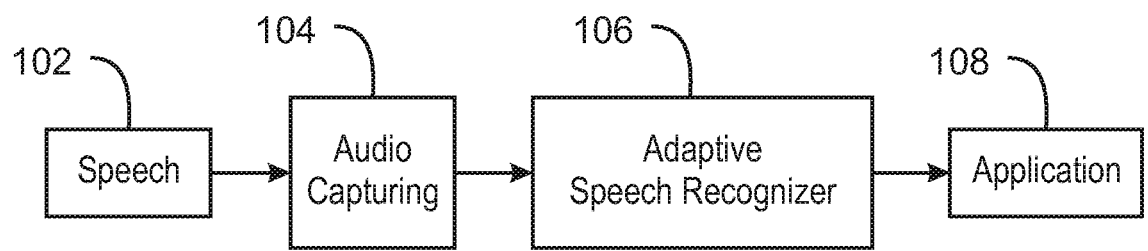
FIG. 1 is a block diagram illustrating an example system for spoken language understanding with adaptive speech recognition.

FIG. 1 is a block diagram illustrating an example system for spoken language understanding with adaptive speech recognition. The example system 100 can be implemented in the computing device 700 in FIG. 7 using the methods 600 of FIG. 6.

The example system 100 includes speech 102 being captured by an audio capturing component 104. For example, the audio capturing component 104 may be a microphone or a microphone array. The system 100 also includes adaptive speech recognizer 106 communicatively coupled to the audio capturing component 104. For example, the adaptive speech recognizer 106 may be the adaptive speech recognizer 200 or the adaptive speech recognizer 400 described with respect to FIGS. 2 and 4. The system 100 includes an application 108 communicatively coupled to the adaptive speech recognizer 106.

In the example system 100 of FIG. 1, an audio capturing component 104 records audio corresponding to speech 102 and provides a speech signal in a suitable format. For example, the format may include speech features, digital audio, or any other suitable format. The speech signal is received by the wake-word-adaptive speech recognizer 106. The wake-word-adaptive speech recognizer 106 processes the speech signal and recognizes the spoken words. The recognized words are then sent to the application 108. For example, the application 108 may be a natural language understanding application that can determine an intent from one or more detected commands in the recognized words. In various examples, the application 108 may be a virtual assistant application.

In various examples, a voice query in the speech 102 may follow the following template: <wake up phrase><voice command>. As one example, "<wake up phrase>":="Hello Computer" and "<voice command>":="Where is the next restaurant?" This voice query may be captured by the audio capturing device 104 and sent to the wake-word-adaptive speech recognizer 106. The wake-word-adaptive speech recognizer 106 can detect the wake-up phrase "hello computer" and use the detected wake-up phrase to improve the recognition accuracy of the following voice command "where is the next restaurant?" In various examples, the wake-word-adaptive speech recognizer 106 adapts speech recognition models to the speaker and the acoustic environment based on the detected wake-word. The wake-word-adaptive speech recognizer 106 can compute an adaptation direction by analyzing the wake-up trigger process.

The wake-word-adaptive speech recognizer 106 can be configured in various ways. For example, in a combined low power configuration, wake-word detection and voice query recognition may share the same neuronal network. However, the decoding may differ, resulting in a lower power consumption of the wake-word detection. For example, the decoder may only consider senones or phonemes that are present in a key-phrase or wake-word. The ASR needs to consider any phonemes of a vocabulary. Thus, the wake-word detection can be executed with a much lower computational and memory usage. An example wake-word-adaptive speech recognizer 106 configured in a Combined Low Power Configuration is described with respect to FIGS. 2 and 3.

In some examples, the wake-word-adaptive speech recognizer 106 can be configured in a dedicated ultra and low power configuration. For example, the wake-word detection may be performed at a dedicated component. As one examples, the dedicated component may operate in an ultra-low power mode. An example wake-word-adaptive speech recognizer 106 configured in a Dedicated Ultra and Low Power Configuration is described with respect to FIGS. 4 and 5.

The diagram of FIG. 1 is not intended to indicate that the example system 100 is to include all of the components shown in FIG. 1. Rather, the example system 100 can be implemented using fewer or additional components not illustrated in FIG. 1 (e.g., additional speech, capturing devices, adaptive speech recognizers, applications, etc.).

Figure 2:
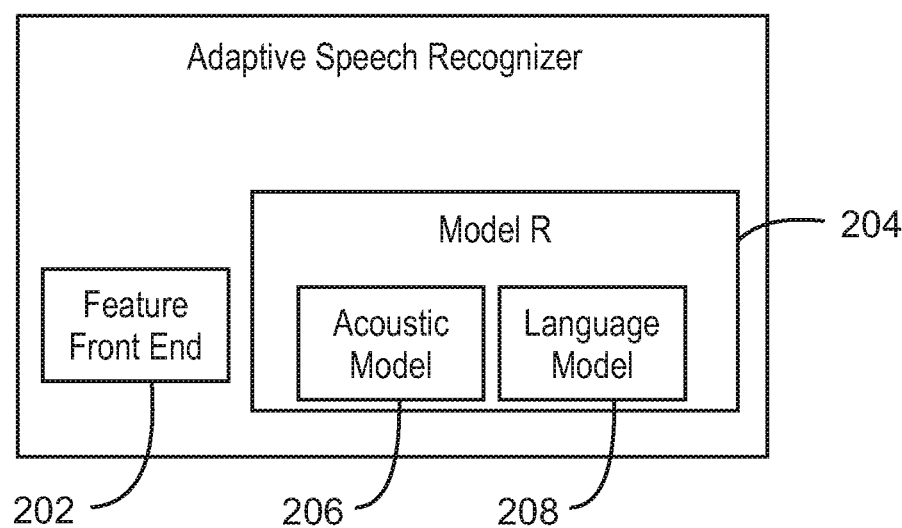
FIG. 2 is a block diagram illustrating an example adaptive speech recognizer.

FIG. 2 is a block diagram illustrating an example adaptive speech recognizer. The example adaptive speech recognizer 200 can be implemented in the computing device 700 in FIG. 7 using the methods 600 of FIG. 6.

The example adaptive speech recognizer 200 includes a feature front end 202. The adaptive speech recognizer 200 includes a Model R 204 communicatively coupled to the feature front end 202. In various examples, the Model R 204 may be a neuronal network. For example, the Model R 204 may be a recurrent neuronal network, a quasi-recurrent neuronal network, a convolutional neural network (CNN), or a time delay neuronal network (TDNN). The Model R 204 includes an acoustic model 206 and a language model 208. For example, the acoustic model 206 is a condition of the audio features given a sequence of phonemes or words represented by the sequence of phonemes. In various examples, the language model 208 may compute a probability that a recognized sequence of words is likely to appear in the context or not. For example, a number of hypotheses may be generated by the Model R 204 and the language model 208 may compute a probability of correctness for each of the hypotheses. In some examples, a decoding process is also included. For example, the decoding process may include a Viterbi beam search or a greedy search. In some examples, the language model 208 can be a weighted finite state transducer or a neuronal network. In various examples, the output of the acoustic model 206 may be multiplied by the output of the language model 208 to generate a most likely word sequence.

In the example of FIG. 2, the feature front end 202 receives the speech signal and computes a stream of speech features. For example, the stream of speech features may be a number of mel-filter banks. The stream of speech features is then received by Model R 204. As one example, the Model R 204 may be a recurrent neuronal network R. The Model R 204 may have two inputs 'h' and 'f' at each time-step. Given a history vector 'h' and a feature vector 'f', and an initial state of Model R 204 $h_0$, the acoustic model 206 computes an output for each time step as described in greater detail with respect to FIG. 3. In some examples, the history vector h is the recurrence signal that is passed from one time step to another in a recurrent neuronal network (RNN). Thus, in various examples, the history vector h may depend on the actual implementation of the RNN. In some examples, the history vector can be a result of an affine transformation with or without activation for an Elman-RNN or a concatenation of multiple vectors from multiple affine transformations with or without activations when a long short term memory (LSTM)-RNN or a gated recurrent unit (GRU)-RNN is used. For example, each of the outputs may be a probability distribution over senones. As used herein, senones refer to acoustic entities that are finer grained than phonemes. The senones may be matched to segments of speech using the acoustic model 206. For example, for each speech segment (frame), the acoustic model 206 may be used to compute a probability distribution over senones. The Model R 204 may then use this distribution to compute a final letter sequence. In some examples, the Model R 204 may also include a weighted finite state transducer used together with a beam search. In various examples, a recurrent neuronal network of the Model R 204 may be used to compute the final letter sequence given a language model 208.

In some examples, the Model R 204 may be a TDNN. For example, the TDNN may operate with multiple interconnected layers of perceptrons. The TDNN may also be implemented as a feedforward neural network. In various examples, all neurons at each layer of a TDNN receive inputs from the outputs of neurons at the layer below. All units in a TDNN, at each layer, obtain inputs from a contextual window of outputs from the layer below. For time varying signals (e.g. speech), each unit has connections to the output from units below but also to the time-delayed past outputs from these same units. This models the units' temporal pattern or trajectory. In addition, a shift-invariance may be achieved by explicitly removing position dependence during backpropagation training. Removing position dependence is done by making time-shifted copies of a network across the dimension of invariance, such as time. The error gradient is then computed by backpropagation through all these networks from an overall target vector. Before performing the weight update, the error gradients associated with shifted copies are averaged and thus shared and constraint to be equal. Thus, all position dependence from backpropagation training through the shifted copies is removed and the copied networks learn the most salient hidden features shift-invariantly. For example, the most salient hidden features may be independent of their precise position in the input data.

The diagram of FIG. 2 is not intended to indicate that the example adaptive speech recognizer 200 is to include all of the components shown in FIG. 2. Rather, the example adaptive speech recognizer 200 can be implemented using fewer or additional components not illustrated in FIG. 2 (e.g., additional feature front ends, models, etc.). In some examples, the adaptive speech recognizer 200 can also include a natural language understanding unit.

Figure 3:
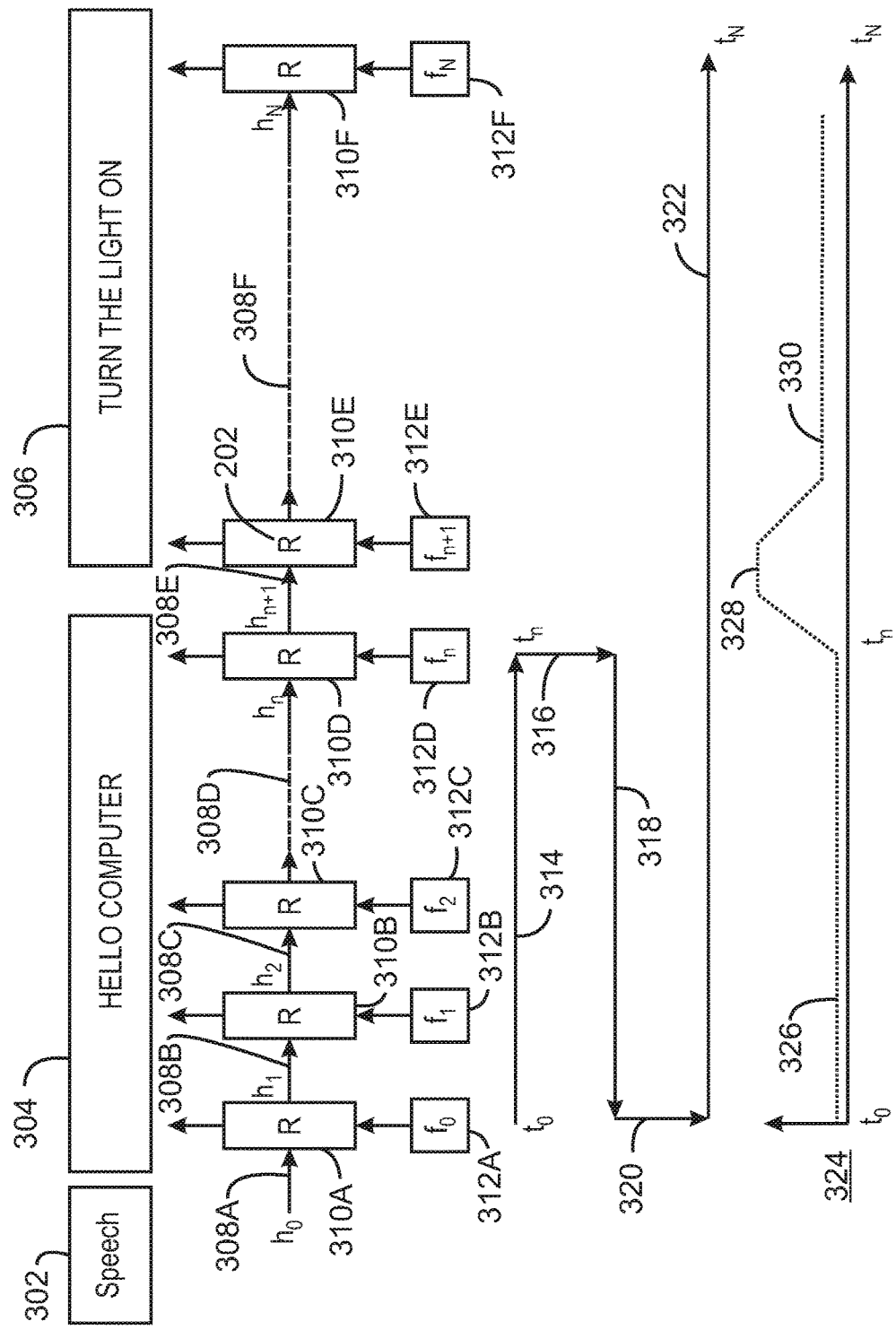
FIG. 3 is a timing diagram illustrating an example process for speech phrase adaptive speech recognition.

FIG. 3 is a timing diagram illustrating an example process for key phrase adaptive speech recognition. The example process 300 can be implemented in the systems 100 of FIG. 1 using the example adaptive speech recognizer 200 of FIG. 2, the computing device 700 of FIG. 7, or the computer readable media 800 of FIG. 8.

FIG. 3 includes speech 302 including a wake-phrase 304 and a command 306. In the example of FIG. 3, the wake-phrase 304 is "hello computer" and the command 306 is "turn the light on." FIG. 3 includes history vectors 308A, 308B, 308C, 308D, 308E, and 308F representing the state of a model R at times 310A, 310B, 310C, 310D, 310E, and 310F. FIG. 3 also includes feature vectors 312A, 312B, 312C, 312D, 312E, 312F received at the model R at times 310A, 310B, 310C, 310D, 310E, and 310F, respectively.

At arrow 314, a forward pass including the key-phrase detection is performed speaker independent. The wake-up phrase "hello computer" is recognized between time steps $t_0$ to $t_n$. The forward pass may be a neuronal network inference step. In various examples, the forward pass may be executed on a low power platform. For example, the low power platform may be a digital signal processor (DSP).

At arrow 316, the detected key-phrase is sent to initialize a speaker dependent model. In response to detecting a key-phrase at $t_n$, the process 300 may initiate a backward pass.

At arrow 318, the backward pass is executed. For example, upon detection of the key-phrase, the observation is used to initialize a speaker dependent model at by adjusting initial state $h_0$. For example, in the backward pass, the error of each time step is back propagated to the initial state $h_0$. In various examples, the error may be computed by comparing the recognized senone probability distribution of the key-phrase which was spoken by a certain speaker with an optimal distribution. Hence, initial state $h_0$ may be updated to minimize the error observed by recognizing a certain speaker. In some examples, in addition to or alternatively to adjusting initial state $h_0$, the process 300 may include updating all weights in the model R. In various examples, a trade-off between adjusting all weights of the model R or just a sub-set of the weights may be based on the target platform configuration. As one example, the subset may be just a weight for initial state $h_0$.

At arrow 322, a speaker dependent fast forward pass is executed. For example, the entire voice query is speaker dependent recognized. In some examples, a false trigger by the speaker independent forward pass 314 can be corrected by the speaker dependent fast forward pass 322 to improve the overall accuracy.

A graph 324 of FIG. 3 shows expected CPU load at different times of the process 300. At time $t_0$ to time $t_n$, the CPU load is minimal in an ultra-low power state 326. At time $t_n$, the CPU load peaks at high power state 328, during which the loss is computed and initial state $h_0$ is updated. At a time following time $t_n$ to a time $t_N$, the CPU load is lower in a low power state 330, in which the command 306 is detected. In various examples, the expected CPU load and associated power consumption may differ for different platform configurations. For example, expected power consumption may depend on a memory set-up given DSP mode.

This process flow diagram is not intended to indicate that the blocks of the example process 300 are to be executed in any particular order, or that all of the blocks are to be included in every case. Further, any number of additional blocks not shown may be included within the example process 300, depending on the details of the specific implementation.

Figure 4:
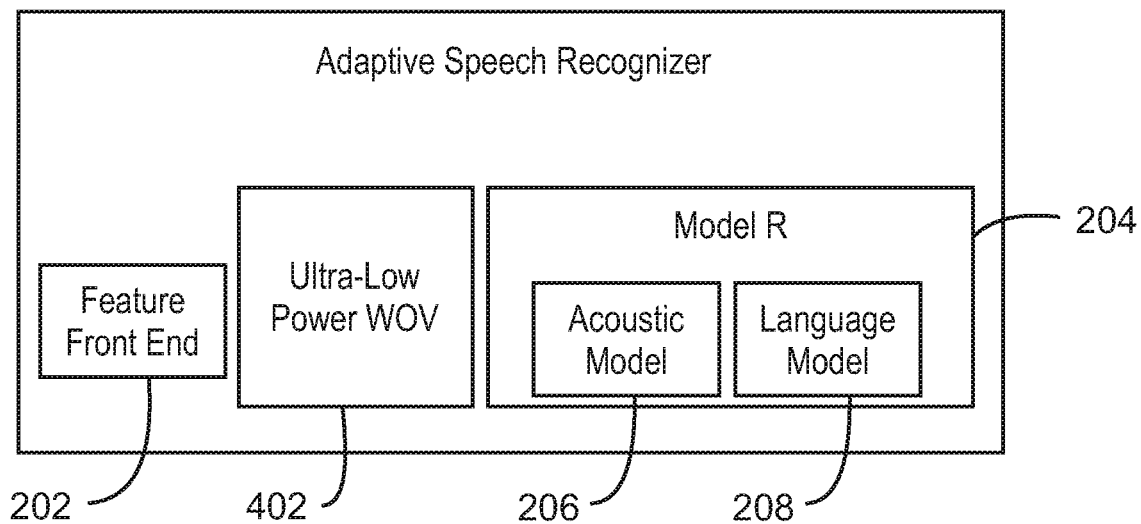
FIG. 4 is a block diagram illustrating an example adaptive speech recognizer with ultra-low power wake-on-voice.

FIG. 4 is a block diagram illustrating an example adaptive speech recognizer with ultra-low power wake-on-voice. The example system 400 can be implemented in the computing device 700 in FIG. 7 using the methods 600 of FIG. 6.

The example adaptive speech recognizer 400 includes similarly numbered elements from FIG. 2. In addition, the adaptive speech recognizer 400 includes an ultra-low power wake-on-voice (WOV) 402. For example, the ultra-low power wake-on-voice (WOV) 402 may operate with a rest of the system powered off. Thus, only the WoV 402 may consume battery power during its operation. When the WoV 402 component detects a key-phrase as described below, the system 400 can move to a low-power state to re-evaluate the audio towards a full recognition/understanding process including adaptation. In some examples, the ultra-low power WoV 402 uses a very small neuronal network that is highly optimized for a specific task. In various examples, this task may also be optimized towards a certain hardware. For example, the task may be optimized for processing with neuronal network hardware acceleration.

In the example of FIG. 4, the ultra-low power wake-on-voice (WOV) 402 may detect wake-on phrases in a stream of audio. A detected wake-on phrase from the ultra-low power wake-on-voice (WOV) 402 may then be used to adapt the Model R 204. Thus, in this example, the Model R 204 does not detect the wake-on phrase and begins execution in response to receiving the wake-on phrase from the ultra-low power wake-on-voice (WOV) 402.

Figure 5:
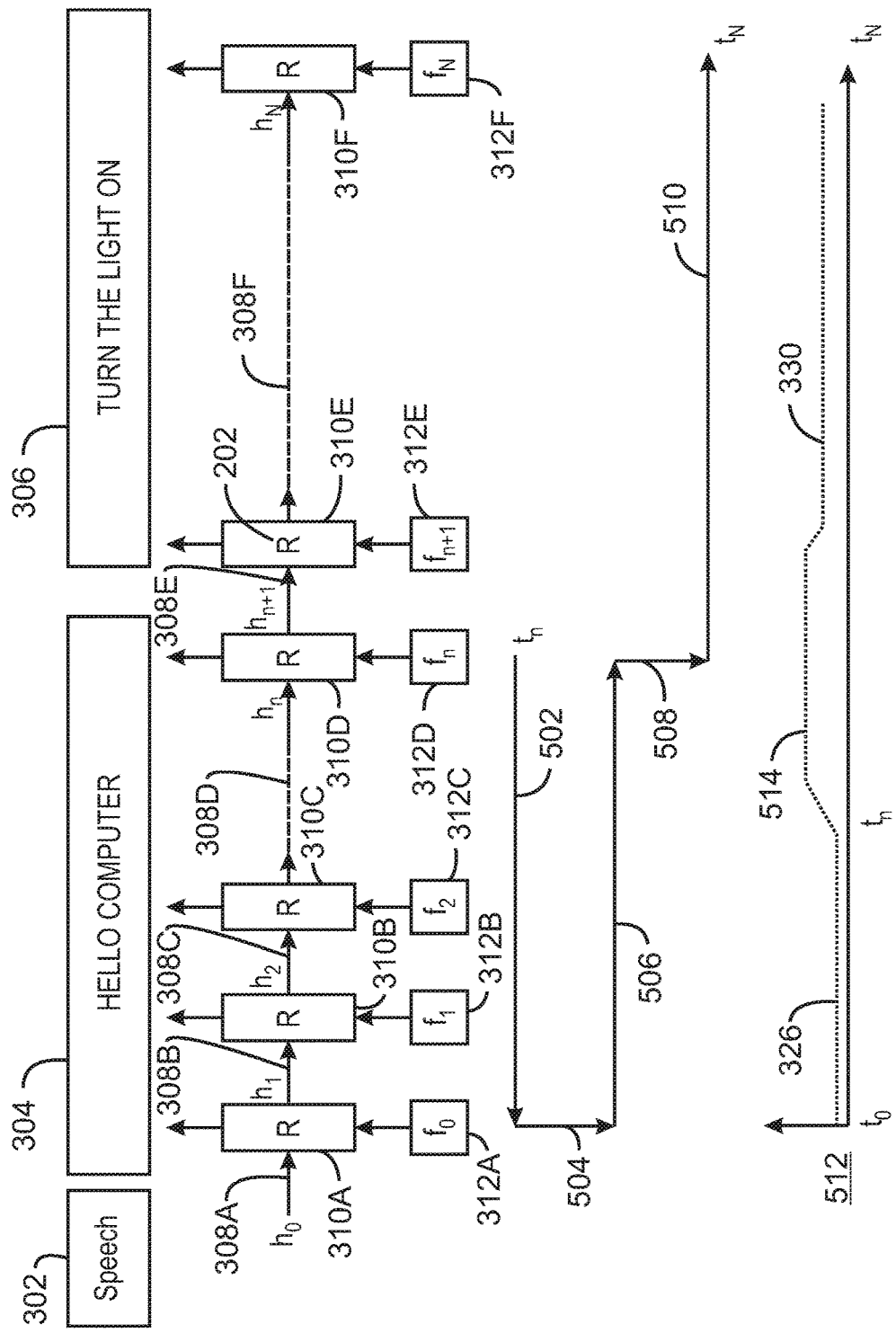
FIG. 5 is a timing diagram illustrating an example process for adaptive speech recognition with ultra-low power wake-on-voice.

In various examples, the adaptive speech recognizer 400 can adapt the model R 204 and perform speech recognition using the process 500 of FIG. 5.

The diagram of FIG. 4 is not intended to indicate that the example adaptive speech recognizer 400 is to include all of the components shown in FIG. 4. Rather, the example adaptive speech recognizer 400 can be implemented using fewer or additional components not illustrated in FIG. 4 (e.g., additional feature front ends, models, etc.). In some examples, the adaptive speech recognizer 400 can also include a natural language understanding unit.

FIG. 5 is a timing diagram illustrating an example process for adaptive speech recognition with ultra-low power wake-on-voice. The example process 500 can be implemented in the systems 100 of FIG. 1 using the example adaptive speech recognizer 400 with ultra-low power wake-on-voice of FIG. 4, the computing device 700 of FIG. 7, or the computer readable media 800 of FIG. 8.

The process 500 of FIG. 5 includes similarly numbered elements of FIG. 3. However, in the process 500, the model R may begin executing upon receiving the example detected wake-on phrase "HELLO COMPUTER" 304 at time $t_n$.

In the example process 500 of FIG. 5, a complete speaker independent wake-up detection process is executed in an ultra-low power model. A triggered wake-word detection 304 causes a Forward/Backward pass to determine the speaker-dependent model R. The voice query 306 is then speaker dependent recognized.

At arrow 502, a forward pass is executed. In the example of FIG. 5, the forward pass includes a backwards decoding of the features $f_n$ to $f_0$. For example, a loss may be computed against the detected wake-on phrase "HELLO COMPUTER" 304. At arrow 504, the computed loss is sent to be used in a backward pass.

At arrow 506, a backward pass is executed. For example, the backward pass includes updating state $h_{n+1}$ based on the computed loss. Thus, instead of updating $h_0$ as described in the process 300 of FIG. 3, the target of process 500 may be to adjust state $h_{n+1}$. At arrow 508, the updated state $h_{n+1}$ is sent to be used in a fast forward pass.

At arrow 510, a fast forward pass is executed. For example, the command "TURN THE LIGHT ON" 306 is detected based on the updated state $h_{n+1}$. This process flow diagram is not intended to indicate that the blocks of the example process 500 are to be executed in any particular order, or that all of the blocks are to be included in every case. Further, any number of additional blocks not shown may be included within the example process 500, depending on the details of the specific implementation.

A graph 512 of FIG. 5 shows expected CPU load at different times of the process 500. At time $t_0$ to time $t_n$, the CPU load is minimal in an ultra-low power state 326. At time $t_n$, the CPU load peaks at high power state 514, during which the loss is computed and initial state $h_0$ is updated. However, the CPU load at high power state 514 may be lower than the CPU load at high power state 328 of FIG. 3. At a time following time $t_n$ to a time $t_N$, the CPU load is lower in a low power state 330, in which the command 306 is detected. Again, in various examples, the expected CPU load and associated power consumption may differ for different platform configurations.

Figure 6:
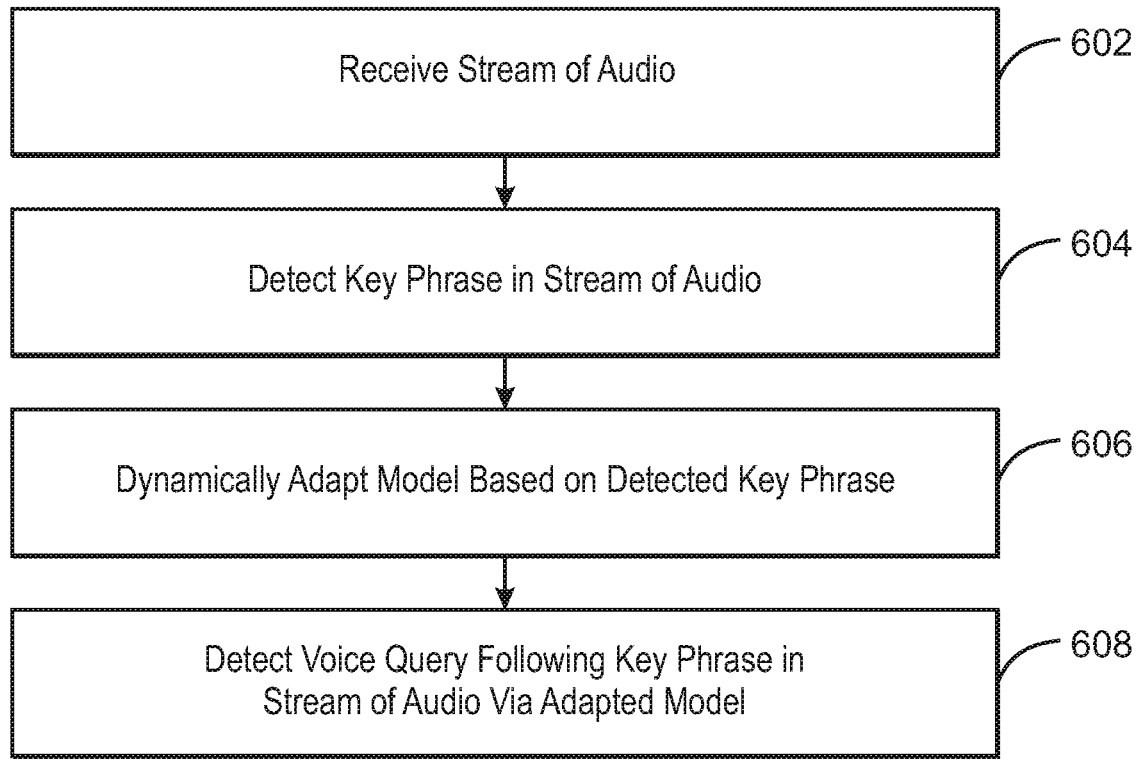
FIG. 6 is a flow chart illustrating a method for adaptively recognizing speech using key phrases.

FIG. 6 is a flow chart illustrating a method for adaptively recognizing speech using key phrases. The example method 600 can be implemented in the system 100 of FIG. 1 using the adaptive speech recognizer 200 or the adaptive speech recognizer 400 of FIGS. 2 and 4, the computing device 700 of FIG. 7, or the computer readable media 800 of FIG. 8.

At block 602, a stream of audio is received. For example, the stream of audio may be captured speech.

At block 604, a key phrase is detected in the stream of audio. For example, a forward pass may be executed on a model to detect the key phrase. In various examples, the key phrase may be a wake-on phrase. For example, the stream of audio may be processed via an ultra-low power wake-on phrase detector to detect the key phrase.

At block 606, a model is dynamically adapted based on the detected key phrase. In some examples, an initial state of a model is adjusted in a backward pass. For example, an error may be back propagated at each time step back to an initial state. In some examples, a number of weights of a model may be adjusted in a backward pass. In various examples, an error is computed by comparing a recognized senone probability distribution of the key-phrase which was spoken by a certain speaker with an optimal distribution. For example, the senone probability distribution may be finer grained than a phoneme or a word sequence. In various examples, any level of granularity may be used. In some examples, the error may be computed in parallel and on different levels of granularity.

At block 608, a voice query is detected following the key phrase in a stream of audio via the adapted model. In some examples, the voice query may be detected by generating probability distributions over senones. In various examples, the voice query may be detected by computing a final letter sequence.

This process flow diagram is not intended to indicate that the blocks of the example method 600 are to be executed in any particular order, or that all of the blocks are to be included in every case. Further, any number of additional blocks not shown may be included within the example method 600, depending on the details of the specific implementation. For example, the method 600 may include generating a stream of speech features based on the stream of audio. The key phrase is detected based on the stream of features.

Figure 7:
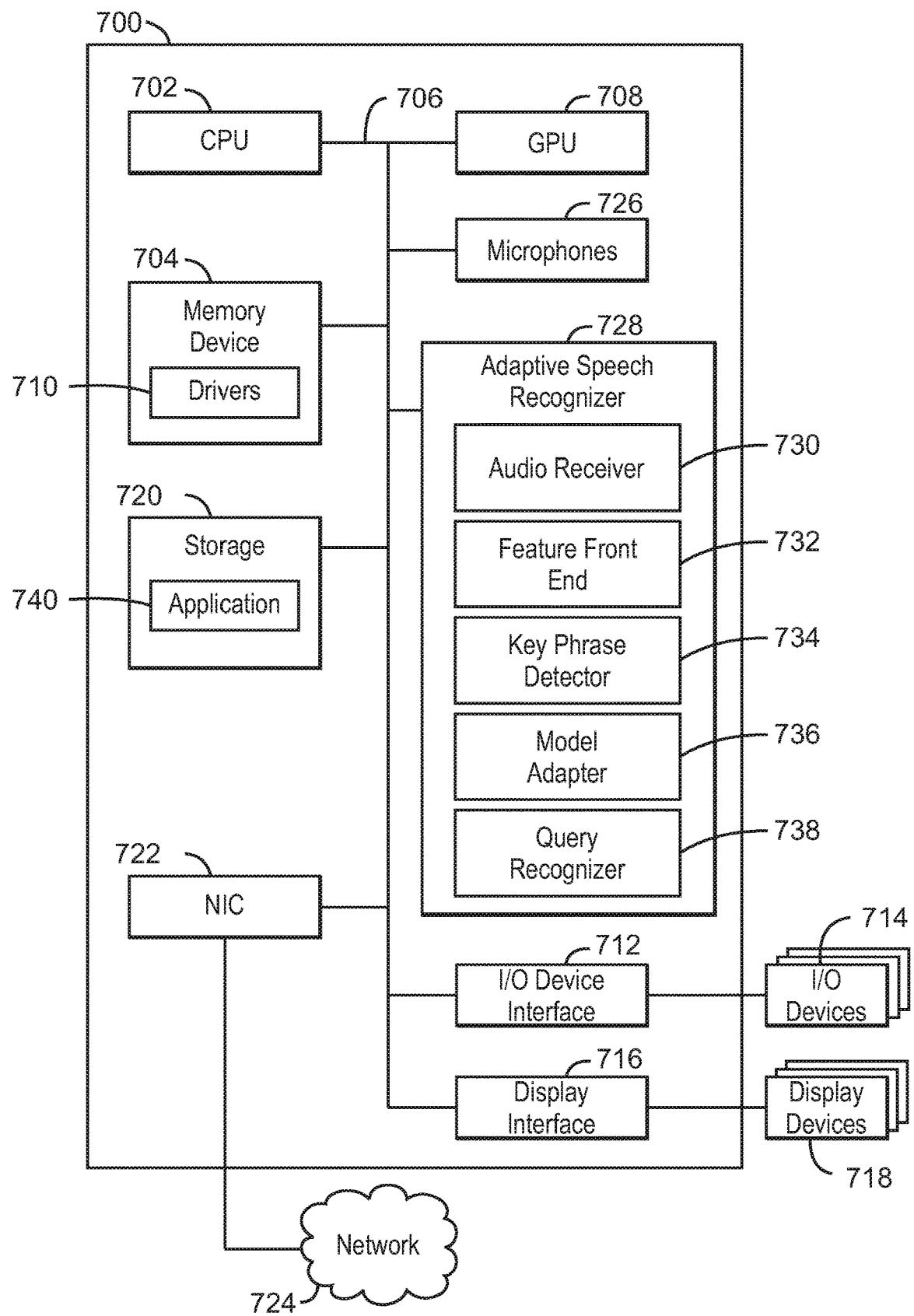
FIG. 7 is block diagram illustrating an example computing device that can adaptively recognize speech using key phrases.

Referring now to FIG. 7, a block diagram is shown illustrating an example computing device that can adaptively recognize speech using key phrases. The computing device 700 may be, for example, a laptop computer, desktop computer, tablet computer, smart television, mobile device, or wearable device, among others. In some examples, the computing device 700 may be a virtual assistant device. In various examples, the computing device 700 may be a medical device. The computing device 700 may include a central processing unit (CPU) 702 that is configured to execute stored instructions, as well as a memory device 704 that stores instructions that are executable by the CPU 702. The CPU 702 may be coupled to the memory device 704 by a bus 706. Additionally, the CPU 702 can be a single core processor, a multi-core processor, a computing cluster, or any number of other configurations. Furthermore, the computing device 700 may include more than one CPU 702. In some examples, the CPU 702 may be a system-on-chip (SoC) with a multi-core processor architecture. In some examples, the CPU 702 can be a specialized digital signal processor (DSP) used for image processing. The memory device 704 can include random access memory (RAM), read only memory (ROM), flash memory, or any other suitable memory systems. For example, the memory device 704 may include dynamic random access memory (DRAM).

The memory device 704 can include random access memory (RAM), read only memory (ROM), flash memory, or any other suitable memory systems. For example, the memory device 704 may include dynamic random access memory (DRAM).

The computing device 700 may also include a graphics processing unit (GPU) 708. As shown, the CPU 702 may be coupled through the bus 706 to the GPU 708. The GPU 708 may be configured to perform any number of graphics operations within the computing device 700. For example, the GPU 708 may be configured to render or manipulate graphics images, graphics frames, videos, or the like, to be displayed to a user of the computing device 700.

The memory device 704 can include random access memory (RAM), read only memory (ROM), flash memory, or any other suitable memory systems. For example, the memory device 704 may include dynamic random access memory (DRAM). The memory device 704 may include device drivers 710 that are configured to execute the instructions for training multiple convolutional neural networks to perform sequence independent processing. The device drivers 710 may be software, an application program, application code, or the like.

The CPU 702 may also be connected through the bus 706 to an input/output (I/O) device interface 712 configured to connect the computing device 700 to one or more I/O devices 714. The I/O devices 714 may include, for example, a keyboard and a pointing device, wherein the pointing device may include a touchpad or a touchscreen, among others. The I/O devices 714 may be built-in components of the computing device 700, or may be devices that are externally connected to the computing device 700. In some examples, the memory 704 may be communicatively coupled to I/O devices 714 through direct memory access (DMA).

The CPU 702 may also be linked through the bus 706 to a display interface 716 configured to connect the computing device 700 to a display device 718. The display device 718 may include a display screen that is a built-in component of the computing device 700. The display device 718 may also include a computer monitor, television, or projector, among others, that is internal to or externally connected to the computing device 700.

The computing device 700 also includes a storage device 720. The storage device 720 is a physical memory such as a hard drive, an optical drive, a thumbdrive, an array of drives, a solid-state drive, or any combinations thereof. The storage device 720 may also include remote storage drives.

The computing device 700 may also include a network interface controller (NIC) 722. The NIC 722 may be configured to connect the computing device 700 through the bus 706 to a network 724. The network 724 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 700 further includes microphones 726. For example, the microphones 726 may include one or more sensors. In some examples, the microphones 726 may include a processor to generate filtered audio. For example, the filtered audio may have noise cancellation applied. In some examples, the microphones 726 may include beamforming to generate filtered audio.

The computing device 700 further includes an adaptive speech recognizer 728. For example, the adaptive speech recognizer 728 can be used to adaptively recognize speech in a steam of audio. The adaptive speech recognizer 728 can include an audio receiver 730, a feature front end 732, a key phrase detector 734, a model adapter 736, and a query recognizer 738. In some examples, each of the components 730-738 of the adaptive speech recognizer 728 may be a microcontroller, embedded processor, or software module. The audio receiver 730 can receive a stream of audio. The feature front end 732 can compute a stream of speech features based on a received stream of audio. For example, the stream of speech features may be a number of mel-filter banks. The key phrase detector 734 can detect a key phrase in the stream of audio. For example, the key phrase detector 734 can detect a key phrase in the stream of audio based on the stream of speech features. In some examples, key phrase detector 734 may be a dedicated ultra-low power wake-on-voice unit to detect the key phrase based on the stream of speech features. For example, the key phrase may be a wake-on phrase. The model adapter 736 can dynamically adapt a model based on the detected key phrase. In some examples, the model includes an acoustic model to generate probability distributions over senones. In various examples, the model includes a language model to compute a final letter sequence. In some examples, the model may be a recurrent neuronal network. In various examples, the model may be a time delay neuronal network. The query recognizer 738 can detect a voice query following the key phrase in a stream of audio via the adapted model.

The storage 720 of the computing device 700 includes an application 740. For example, the application 740 may use the detected voice query to execute one or more actions. As one example, the application 740 may be a natural language understanding application. In various examples, the application 108 may be a virtual assistant application. In some examples, the application 740 may be any voice-control application.

The block diagram of FIG. 7 is not intended to indicate that the computing device 700 is to include all of the components shown in FIG. 7. Rather, the computing device 700 can include fewer or additional components not illustrated in FIG. 7, such as additional buffers, additional processors, and the like. In some examples, the computing device 700 may include a digital signal processor to detect the key phrase. In various examples, the computing device 700 may include a neural network to detect the key phrase and adapt the model. The computing device 700 may include any number of additional components not shown in FIG. 7, depending on the details of the specific implementation. Furthermore, any of the functionalities of the audio receiver 730, the feature front end 732, the key phrase detector 734, the model adapter 736, and the query recognizer 738, may be partially, or entirely, implemented in hardware and/or in the processor 702. For example, the functionality may be implemented with an application specific integrated circuit, in logic implemented in the processor 702, or in any other device. In addition, any of the functionalities of the CPU 702 may be partially, or entirely, implemented in hardware and/or in a processor. For example, the functionality of the adaptive speech recognizer 728 may be implemented with an application specific integrated circuit, in logic implemented in a processor, in logic implemented in a specialized graphics processing unit such as the GPU 708, or in any other device.

Figure 8:
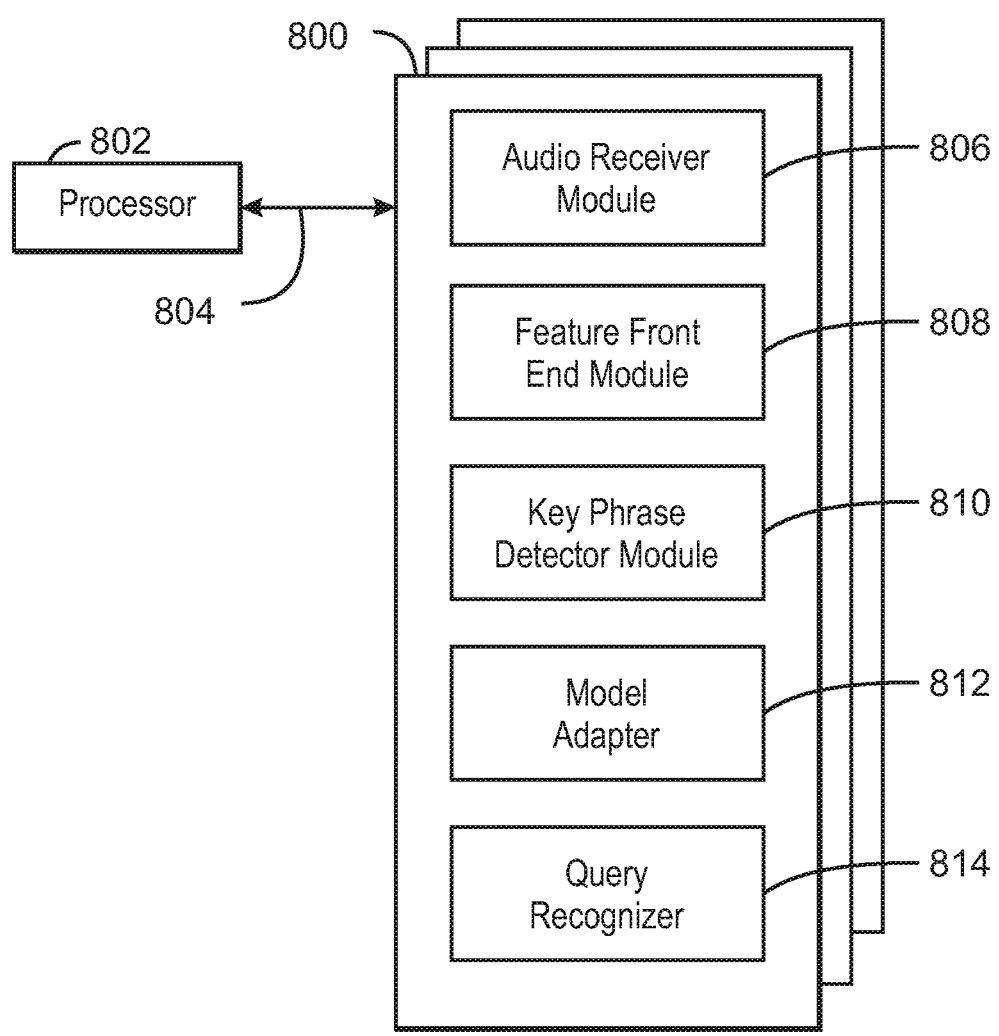
FIG. 8 is a block diagram showing computer readable media that store code for adaptive key phrase speech recognition.

FIG. 8 is a block diagram showing computer readable media 800 that store code for adaptive key phrase speech recognition. The computer readable media 800 may be accessed by a processor 802 over a computer bus 804. Furthermore, the computer readable medium 800 may include code configured to direct the processor 802 to perform the methods described herein. In some embodiments, the computer readable media 800 may be non-transitory computer readable media. In some examples, the computer readable media 800 may be storage media.

The various software components discussed herein may be stored on one or more computer readable media 800, as indicated in FIG. 8. For example, an audio receiver module 806 may be configured to receive a stream of audio. A feature front end module 808 may be configured to generating a stream of speech features based on the stream of audio. A key phrase module 810 may be configured to detect a key phrase in the stream of audio. In some examples, key phrase module 810 may be configured to detect the key phrase based on the stream of features. In various examples, the key phrase module 810 may be configured to execute a forward pass on the model to detect the key phrase. In some examples, the key phrase module 810 may be configured to process the stream of audio via an ultra-low power wake-on phrase detector. In various examples, the key phrase module 810 may be configured to generate a stream of speech features based on the stream of audio. For example, the key phrase module 810 may be configured to detect the key phrase based on the stream of features. A model adapter module 812 may be configured to dynamically adapt a model based on the detected key phrase. For example, the model adapter module 812 may include code to propagate an error at each time step back to an initial state. In some examples, the model adapter module 812 may include code to adjust a number of weights of a model in a backward pass. In various examples, the model adapter module 812 may include code to compute an error by comparing a recognized senone probability distribution of the key-phrase which was spoken by a certain speaker with an optimal distribution. In some examples, the model adapter module 812 may include code to adjust an initial state of a model in a backward pass. A query recognizer module 814 may be configured to detect a voice query following the key phrase in a stream of audio via the adapted model. For example, the query recognizer module 814 may be configured to generate probability distributions over senones. In some examples, the query recognizer module 814 may be configured to detect the voice query by computing a final letter sequence.

The block diagram of FIG. 8 is not intended to indicate that the computer readable media 800 is to include all of the components shown in FIG. 8. Further, the computer readable media 800 may include any number of additional components not shown in FIG. 8, depending on the details of the specific implementation.

EXAMPLES

Example 1 is an apparatus for recognizing speech. The apparatus includes an audio receiver to receive a stream of audio. The apparatus also includes a key phrase detector to detect a key phrase in the stream of audio. The apparatus further includes a model adapter to dynamically adapt a model based on the detected key phrase. The apparatus also further includes a query recognizer to detect a voice query following the key phrase in a stream of audio via the adapted model.

Example 2 includes the apparatus of example 1, including or excluding optional features. In this example, the apparatus includes a digital signal processor to detect the key phrase.

Example 3 includes the apparatus of any one of examples 1 to 2, including or excluding optional features. In this example, the apparatus includes a neural network to detect the key phrase and adapt the model.

Example 4 includes the apparatus of any one of examples 1 to 3, including or excluding optional features. In this example, the apparatus includes a dedicated ultra-low power wake-on-voice unit to detect the key phrase based on the stream of speech features.

Example 5 includes the apparatus of any one of examples 1 to 4, including or excluding optional features. In this example, the key phrase includes a wake-on phrase.

Example 6 includes the apparatus of any one of examples 1 to 5, including or excluding optional features. In this example, the apparatus includes a feature front end to compute a stream of speech features based on a received stream of audio.

Example 7 includes the apparatus of any one of examples 1 to 6, including or excluding optional features. In this example, the model includes an acoustic model to generate probability distributions over senones.

Example 8 includes the apparatus of any one of examples 1 to 7, including or excluding optional features. In this example, the model includes a language model to compute a final letter sequence.

Example 9 includes the apparatus of any one of examples 1 to 8, including or excluding optional features. In this example, the model includes a recurrent neuronal network.

Example 10 includes the apparatus of any one of examples 1 to 9, including or excluding optional features. In this example, the model includes a time delay neuronal network.

Example 11 is a method for recognizing speech. The method includes receiving, via a processor, a stream of audio. The method also includes detecting, via the processor, a key phrase in the stream of audio. The method further includes dynamically adapting, via the processor, a model based on the detected key phrase. The method also further includes detecting, via the processor, a voice query following the key phrase in a stream of audio via the adapted model.

Example 12 includes the method of example 11, including or excluding optional features. In this example, adapting the model includes back propagating an error at each time step back to an initial state.

Example 13 includes the method of any one of examples 11 to 12, including or excluding optional features. In this example, adapting the model includes adjusting a plurality of weights of a model in a backward pass.

Example 14 includes the method of any one of examples 11 to 13, including or excluding optional features. In this example, adapting the model includes computing an error by comparing a recognized senone probability distribution of the key-phrase which was spoken by a certain speaker with an optimal distribution.

Example 15 includes the method of any one of examples 11 to 14, including or excluding optional features. In this example, adapting the model includes adjusting an initial state of a model in a backward pass.

Example 16 includes the method of any one of examples 11 to 15, including or excluding optional features. In this example, detecting the key phrase includes executing a forward pass on the model.

Example 17 includes the method of any one of examples 11 to 16, including or excluding optional features. In this example, detecting the key phrase includes processing the stream of audio via an ultra-low power wake-on phrase detector.

Example 18 includes the method of any one of examples 11 to 17, including or excluding optional features. In this example, the method includes generating a stream of speech features based on the stream of audio. The key phrase is detected based on the stream of features.

Example 19 includes the method of any one of examples 11 to 18, including or excluding optional features. In this example, detecting the voice query includes generating probability distributions over senones.

Example 20 includes the method of any one of examples 11 to 19, including or excluding optional features. In this example, detecting the voice query includes computing a final letter sequence.

Example 21 is at least one computer readable medium for recognizing speech having instructions stored therein that direct the processor to receive a stream of audio. The computer-readable medium also includes instructions that direct the processor to detect a key phrase in the stream of audio. The computer-readable medium further includes instructions that direct the processor to dynamically adapt a model based on the detected key phrase. The computer-readable medium also further includes instructions that direct the processor to detect a voice query following the key phrase in a stream of audio via the adapted model.

Example 22 includes the computer-readable medium of example 21, including or excluding optional features. In this example, the computer-readable medium includes instructions to propagate an error at each time step back to an initial state.

Example 23 includes the computer-readable medium of any one of examples 21 to 22, including or excluding optional features. In this example, the computer-readable medium includes instructions to adjust a plurality of weights of a model in a backward pass.

Example 24 includes the computer-readable medium of any one of examples 21 to 23, including or excluding optional features. In this example, the computer-readable medium includes instructions to compute an error by comparing a recognized senone probability distribution of the key-phrase which was spoken by a certain speaker with an optimal distribution.

Example 25 includes the computer-readable medium of any one of examples 21 to 24, including or excluding optional features. In this example, the computer-readable medium includes instructions to adjust an initial state of a model in a backward pass.

Example 26 includes the computer-readable medium of any one of examples 21 to 25, including or excluding optional features. In this example, the computer-readable medium includes instructions to execute a forward pass on the model to detect the key phrase.

Example 27 includes the computer-readable medium of any one of examples 21 to 26, including or excluding optional features. In this example, the computer-readable medium includes instructions to process the stream of audio via an ultra-low power wake-on phrase detector.

Example 28 includes the computer-readable medium of any one of examples 21 to 27, including or excluding optional features. In this example, the computer-readable medium includes instructions to generate a stream of speech features based on the stream of audio. The key phrase is detected based on the stream of features.

Example 29 includes the computer-readable medium of any one of examples 21 to 28, including or excluding optional features. In this example, the computer-readable medium includes instructions to generate probability distributions over senones.

Example 30 includes the computer-readable medium of any one of examples 21 to 29, including or excluding optional features. In this example, the computer-readable medium includes instructions to compute a final letter sequence to detect the voice query.

Example 31 is a system for recognizing speech. The system includes an audio receiver to receive a stream of audio. The system also includes a key phrase detector to detect a key phrase in the stream of audio. The system further includes a model adapter to dynamically adapt a model based on the detected key phrase. The system also further includes a query recognizer to detect a voice query following the key phrase in a stream of audio via the adapted model.

Example 32 includes the system of example 31, including or excluding optional features. In this example, the system includes a digital signal processor to detect the key phrase.

Example 33 includes the system of any one of examples 31 to 32, including or excluding optional features. In this example, the system includes a neural network to detect the key phrase and adapt the model.

Example 34 includes the system of any one of examples 31 to 33, including or excluding optional features. In this example, the system includes a dedicated ultra-low power wake-on-voice unit to detect the key phrase based on the stream of speech features.

Example 35 includes the system of any one of examples 31 to 34, including or excluding optional features. In this example, the key phrase includes a wake-on phrase.

Example 36 includes the system of any one of examples 31 to 35, including or excluding optional features. In this example, the system includes a feature front end to compute a stream of speech features based on a received stream of audio.

Example 37 includes the system of any one of examples 31 to 36, including or excluding optional features. In this example, the model includes an acoustic model to generate probability distributions over senones.

Example 38 includes the system of any one of examples 31 to 37, including or excluding optional features. In this example, the model includes a language model to compute a final letter sequence.

Example 39 includes the system of any one of examples 31 to 38, including or excluding optional features. In this example, the model includes a recurrent neuronal network.

Example 40 includes the system of any one of examples 31 to 39, including or excluding optional features. In this example, the model includes a time delay neuronal network.

Example 41 is a system for recognizing speech. The system includes means for receiving a stream of audio. The system also includes means for detecting a key phrase in the stream of audio. The system further includes means for dynamically adapting a model based on the detected key phrase. The system also further includes means for detecting a voice query following the key phrase in a stream of audio via the adapted model.

Example 42 includes the system of example 41, including or excluding optional features. In this example, the system includes means for detecting the key phrase.

Example 43 includes the system of any one of examples 41 to 42, including or excluding optional features. In this example, the system includes means for detecting the key phrase and adapt the model.

Example 44 includes the system of any one of examples 41 to 43, including or excluding optional features. In this example, the system includes means for detecting the key phrase based on the stream of speech features.

Example 45 includes the system of any one of examples 41 to 44, including or excluding optional features. In this example, the key phrase includes a wake-on phrase.

Example 46 includes the system of any one of examples 41 to 45, including or excluding optional features. In this example, the system includes means for computing a stream of speech features based on a received stream of audio.

Example 47 includes the system of any one of examples 41 to 46, including or excluding optional features. In this example, the model includes an acoustic model to generate probability distributions over senones.

Example 48 includes the system of any one of examples 41 to 47, including or excluding optional features. In this example, the model includes a language model to compute a final letter sequence.

Example 49 includes the system of any one of examples 41 to 48, including or excluding optional features. In this example, the model includes a recurrent neuronal network.

Example 50 includes the system of any one of examples 41 to 49, including or excluding optional features. In this example, the model includes a time delay neuronal network.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus comprising:
   interface circuitry;
   instructions; and
   programmable circuitry to be programmed by the instructions to:
   detect a key phrase in a stream of audio with a key phrase detection model;
   dynamically adapt an automatic speech recognition (ASR) model based on estimated speaker features in the detected key phrase and estimated acoustic environment features in the detected key phrase by:
   computing an error based on a comparison of a recognized senone probability distribution of the key phrase which was spoken by a speaker and an optimal distribution;
   adjusting the ASR model based on the error;
   adjusting a weight of a history vector of the ASR model in a backward pass; and
   adjusting a weight of a feature vector of the ASR model in a backward pass;
   detect a voice query following the key phrase in a stream of audio via the adapted ASR model; and
   cause execution of an action based on the voice query.

2. The apparatus of claim 1, wherein the programmable circuitry includes a digital signal processor.

3. The apparatus of claim 1, wherein the programmable circuitry implements the key phrase detection model with a neural network to detect the key phrase.

4. The apparatus of claim 1, wherein the programmable circuitry is to operate in a first power mode to detect the key phrase and to operate in a second power mode to detect the voice query.

5. The apparatus of claim 1, wherein the key phrase includes a wake-on phrase.

6. The apparatus of claim 1, wherein the programmable circuitry is to compute a stream of speech features based on the stream of audio.

7. The apparatus of claim 1, wherein the ASR model includes an acoustic model to generate the probability distributions over senones.

8. The apparatus of claim 1, wherein the ASR model includes a language model to compute a final letter sequence.

9. The apparatus of claim 1, wherein the ASR model includes a recurrent neural network.

10. The apparatus of claim 1, wherein the ASR model includes a time delay neural network.

11. A method for recognizing speech, the method comprising:
    detecting, by executing a key phrase detection model with at least one processor, a key phrase in the stream of audio;
    dynamically adapting, by executing instructions with at least one of the at least one processor, an automatic speech recognition (ASR) model based on estimated speaker features in the detected key phrase and estimated acoustic environment features in the detected key phrase by:
    comparing a recognized senone probability distribution of the key phrase which was spoken by a speaker with an optimal distribution to compute an error,
    propagating the error to an initial state of the ASR model,
    adjusting a weight of a history vector of the ASR model in a backward pass, and
    adjusting a weight of a feature vector of the ASR model in a backward pass;
    detecting, by executing the adapted ASR model with at least one of the at least one processor, a voice query following the key phrase in a stream of audio; and
    causing, by executing instructions with at least one of the at least one processor, execution of an action associated with the voice query.

12. The method of claim 11, wherein the dynamically adapting of the ASR model includes propagating the error at each time step back to an initial state of the ASR model.

13. The method of claim 11, wherein the detecting of the key phrase includes executing a forward pass on the ASR model.

14. The method of claim 11, wherein the detecting of the key phrase includes processing the stream of audio via an ultra-low power mode.

15. The method of claim 11, further including generating a stream of speech features based on the stream of audio, wherein the key phrase is detected based on the stream of features.

16. The method of claim 11, wherein the detecting of the voice query includes generating probability distributions over senones.

17. The method of claim 11, wherein the detecting of the voice query includes computing a final letter sequence.

18. At least one computer readable storage device or storage disk comprising instructions to cause programmable circuitry to at least:
    detect a key phrase in a stream of audio via a forward pass of a key phrase detection model;
    dynamically adapt an automatic speech recognition (ASR) model into an adapted ASR model based on estimated speaker features in the detected key phrase and estimated acoustic environment features in the detected key phrase by:
    computing an error based on a senone probability distribution of the key-phrase; and
    propagating the error to an initial state of the ASR model, and adjusting weights of a history vector and a feature vector of the ASR model in a backward pass to generate the adapted ASR model;
    execute the adapted ASR model to detect a voice query following the key phrase in the stream of audio; and
    cause performance of an action based on the voice query.

19. The at least one computer readable storage device or storage disc of claim 18, wherein the instructions cause the programmable circuitry to propagate the error at each time step back to the initial state.

20. The at least one computer readable storage device or storage disc of claim 18, wherein the instructions cause the programmable circuitry to compute the error by comparing the senone probability distribution with a reference distribution.

21. The apparatus of claim 1, wherein the programmable circuitry is to detect the voice query by computing a final letter sequence.

22. The apparatus of claim 4, wherein the programmable circuitry is to consume more power in the second power mode than in the first power mode.

23. The apparatus of claim 1, wherein the programmable circuitry is to dynamically adapt the ASR model in a hidden state of the ASR model by adjusting the weight of the history vector and the weight of the feature vector in parallel.

* * * * *